Patented Mar. 3, 1925.

1,528,716

UNITED STATES PATENT OFFICE.

GEORGE H. WIGTON, OF EUREKA, UTAH.

METHOD OF TREATING OXIDIZED METALLIC ORES.

No Drawing.  Application filed April 4, 1922. Serial No. 549,571.

*To all whom it may concern:*

Be it known that I, GEORGE H. WIGTON, a citizen of the United States, residing at Eureka, in the county of Juab and State of Utah, have invented certain new and useful Improvements in Methods of Treating Oxidized Metallic Ores; and I do hereby declare the following to be a full, clear, and exact description of the same.

This invention relates to the recovery of metals from oxidized ores which do not readily respond to treatment by the standard methods, and has for its object the provision of a method of treating such ores so that a large percentage of the lead, silver, or gold may be recovered.

It is well known that oxidized lead and silver minerals are difficult to recover by the standard concentration methods such as the gravity concentration and the flotation systems. While flotation will make satisfactory recoveries on slimed sulphides and on certain of the precious native metals such as gold and silver it will not recover any appreciable proportion of metal from oxidized minerals. Gravity concentration will recover the sandy portion of the oxidized minerals but will not recover the slimed portion.

The method forming the subject matter of the present invention is a step in the general recovery of the metals and consists briefly in agitating a pulp consisting of finely ground ore and water with a soluble chloride and metallic iron preferably in the presence of heat; this results in the formation of a spongy product, consisting largely of metallic lead and carrying a large portion of the gold and silver present in the ore, and which can be separated from the gangue by concentration methods. Although the heat is not indispensable, it greatly promotes the conversion of the oxidized mineral into metal.

The oxidized ore, containing compounds of metals which are electro-negative to iron, such for example as lead, copper, silver, and gold, is ground until the valuable minerals are liberated from the gangue. The degree of comminution required depends on the character of the ore being treated. If comparatively coarse grinding will liberate the valuable minerals from the gangue, the coarse or sandy portion will preferably be treated by gravity concentration, with the production of a concentrate, and a coarse tailing to be discarded; the slimed portion will then be treated by the method of the present invention, which is efficient in recovering the slimed oxidized mineral, or mineral which will pass through a 100-mesh screen. A 10% soluton of common salt in water is added to the finely ground ore until a thick pulp is formed. This will be equivalent to a salt consumption of 3% to 5% of the weight of the ore. Sufficient finely divided metallic iron to replace the lead, gold and silver in the oxidized mineral is then added and the resulting pulp is agitated until the cementation has ceased, the temperature being preferably maintained at about 60° C. (140° F.). The combined operations of grinding and cementation may be carried out in the grinding mill by applying heat and adding the necessary reagents to the feed to the grinder.

It will be understood by those familiar with the art that the ore treated may be a composite consisting in oxidized ore in any proportion with the sulphide ore, or the ore may be practically 100% oxidized ore.

The iron employed in this process should preferably be in a finely divided state such as "sponge iron" or the fine iron produced by abrasion in a ball mill. In the place of salt any readily soluble chloride can be used as its function appears to be that of an electrolyte, although for obvious commercial reasons salt will generally be used in the process as it is much cheaper than any other chloride. In the same way any metal which is more electro-positive than iron can be substituted for iron, and while the process would undoubtedly be better or at least quicker there would be no commercial advantage in the substitution of any other metal for iron on account of the relatively greater cost.

On account of the impurities in the ore it is not possible to give an absolutely accurate chemical equation. In the oxidized ore there would be present a mixture of the various oxides of the metal, a large proportion of carbonate and possibly and usually a quantity of the silicate. In the case of lead there would be without doubt a small quantity of lead chloride present which is somewhat soluble in water.

The action in the case of lead carbonate for instance would produce iron carbonate and metallic lead leaving the water and salt unchanged in amount after the reaction is complete, the lead carbonate being converted to metallic lead in this manner and forming a heavy, spongy, and cohesive product from which the gangue can be separated by decantation or other methods of gravity concentration; or it may be separated by the flotation process. In case sulphides are present in the pulp the spongy lead will entrap large quantities of them and will also collect a large portion of the reduced gold and silver.

It is the intention to combine the method herein described with other treatment methods in such a manner as to produce the maximum economical recovery, for example, a partially oxidized ore can be treated by a combination of the method forming the subject matter of this invention, and the flotation process. In a test run at the Chief Consolidated Mine at Eureka, Utah, a recovery of 88.8% of lead was had from a composite sample consisting of about three parts of oxidized ore to one part of sulphide ore.

A very minute quantity of common salt will cause the reduction of the lead or other metal in the presence of water and metallic iron, and when a lead carbonate ore is finely ground in a ball mill with water which contains as little as seventy parts of common salt per million parts of water a small amount of spongy metallic lead can be detected in the pulp. Since the purpose of the salt is to render the water electrically conductive the reaction will proceed much more rapidly with a larger proportion of salt. With an ore pulp containing 30% of water the reaction will proceed rapidly if the salt is as great as 3% of the weight of the ore and with a higher proportion of water as for example 50% about 5% of common salt is found to give the best results.

What I claim is:

1. The step in the process of reducing an oxidized lead-silver ore which consists in agitating the finely ground ore in an electrolyte in presence of a finely divided metal electro-positive with respect to the metal of the ore and in concentrating the metal content.

2. The step in the process of reducing an oxidized metal ore which consists in agitating the finely ground ore in an electrolyte consisting of a solution of sodium chloride in presence of a finely divided metal electro-positive with respect to the metal of the ore and in concentrating the metal content.

3. The step in the process of reducing a slimed oxidized lead-silver ore which consists in agitating the finely ground ore in a soluble chlorid electrolyte in presence of finely divided iron and in concentrating the metal content.

4. The process of agitating a pulp consisting of finely ground lead-silver ore and water with metallic iron, and a small percentage of common salt, and separating the spongy product from the gangue by concentration methods.

5. The process of agitating a pulp consisting of finely ground lead-silver ore and water with metallic iron and a small percentage of a soluble chloride and separating the spongy product from the gangue by concentration methods.

6. The step in the process of obtaining lead from its oxidized ore which consists in mixing the finely ground ore with from 20% to 60% of water and from 2% to 6% of a soluble chloride agitating the pulp thus obtained with finely divided iron at a temperature of approximately 60° C. and in separating the spongy mass of lead from the gangue.

7. The step in the process of obtaining lead from its oxidized ore which consists in mixing the finely ground ore with 50% of water and 4% of a soluble chloride, agitating the pulp thus obtained with finely divided iron at a temperature in excess of 40° C. and in separating the spongy mass of lead from the gangue.

GEORGE H. WIGTON.